3,311,492
METHOD OF INSOLUBILIZING STARCH BY RE-
     ACTION WITH SODIUM STANNATE
Robert T. Hart, West Rumford, Maine, assignor to Ox-
  ford Paper Company, New York, N.Y., a corporation
  of Maine
No Drawing. Filed May 6, 1966, Ser. No. 548,046
             5 Claims. (Cl. 117—62.2)

This is a continuation-in-part application of my applications Ser. No. 262,181 filed Mar. 1, 1963, now abandoned, and Ser. No. 61,061 filed Oct. 7, 1960, now abandoned.

This invention relates to insolubilization of starch and to practical applications thereof. In one of its preferred applications the invention relates more particularly to the production, by practical means, of a pigmented starch coating for paper and paperboard that exhibits an excellent degree of insolubilization. In another preferred application, the invention relates to the production, by practical means, of starch adhesives that become insoluble after their application as adhesives in the lamination of paper and paperboard.

It will be most advantageous as an aid to understanding the novelty, scope, and utility of this invention to describe briefly the present state of the art of adhesives commonly employed as binders in the production of pigment coated papers and paperboards.

Primarily, the chief types of binders used today for paper coatings are starch, casein, soy protein, styrene-butadiene latices, acrylic latices, and polyvinyl alcohol. Of these the relative consumption on a dry basis of the three leading adhesive types is 120 million pounds of starch, 35 million pounds of casein, and approximately 20 million pounds of latices of all types. Economically, starch is the preferred choice because of its relatively low cost. Total corn starch products consumed by the paper industry in the year 1955 for all purposes including laminating and corrugating was in the neighborhood of 700 million pounds.

Corn, potato and tapioca are examples of three varieties of starch commonly used as adhesives and by the paper industry. All of these starches are available as common, raw, or unmodified starches. In order to use such common starches as adhesives or in coating compositions they must be dispersed in water. Cooking of such starch suspensions causes some degeneration of the starch particles resulting in improved stability and increased viscosity. Even when cooked such starch solutions are still highly viscous at solids concentrations as low as 3 to 4% and have a marked tendency to congeal and retrograde resulting in gel-like masses that have none of the flow properties required of a coating composition. Such starch cooks are thus modified by known techniques which modifies the viscosity and coating characteristics of the solutions so they can be used as an adhesive especially for the pigment coating of paper. This modification is generally accomplished by the well-known enzyme conversion of common starches. Such starches are commonly referred to in the art as enzyme converted starch. Other methods of modifying cooked starch in order to increase the solubility thereof in water as well as to reduce viscosity are also known to those skilled in the art and include the hydroxy ethylation of starch, and the acetylation of starch. Such modified starches are referred to as hydroxy ethylated starch and acetylated starch.

The term starch as used herein means starches which are modified to permit the preparation of aqueous solutions thereof having a solids content in excess of that normally obtainable with starches which have only been cooked, i.e., in excess of about 12% by weight solids and preferably in excess of about 25% by weight solids. Examples of starches include those which are free of carboxyl groups such as the enzyme converted starches, the hydroxy ethylated starches and the acetylated starches referred to above as well as starches containing carboxyl groups such as the so-called oxidized or chlorinated starches. All of these types of starches are, of course, well known.

Unfortunately, starch adhesives possess one major drawback, namely, lack of resistance to water. Starch is an amylaceous, long chain material bearing many hydroxyl groups which show a tendency to associate with hydrophilic solvents such as water. A dried, pigmented starch coating tends, upon remoistening, to soften and lost its integrity so that the coated surface tends to "pick" on the blanket of the offset press. Thus, recourse has, of necessity, been made to the more water-resistant, but more expensive, adhesives such as casein and latices for many purposes for which starch adhesives would otherwise have been preferred. Some of these uses are for lithographic and offset printing, labels, wallpaper and board, posters, containers and folding cartons, all of which require a degree of insolubilization (or wet-rub resistance) not demonstrated by conventional starch coatings.

The problem of conferring upon starch adhesives an adequate degree of insolubilization has become a classic one within the coated paper industry and one upon which much effort has been expended with varying degrees of lack of success. Of the methods which have been proposed relatively few have been adopted commercially, and even these have not been widely used because the degree of insolubilization, or wet-rub, attained has not been sufficiently great to over-come the sensitivity of the starch film to water.

As pointed out by Black [1] in his excellent Monograph on Water Resistant Starch Coatings, attacks upon the problem have been directed along three general avenues:

(1) The addition of water-resistant materials in admixture with starch adhesives to produce a mixed film exhibiting water resistance in proportion to the relative percentage of the so-included component. Unfortunately, this requires so large an amount of the water-resistant material to overcome the extreme water sensitivity of the starch that the starch is likely to become the minor ingredient.

(2) Another approach has been to incorporate in the starch adhesive certain water-repellant materials to reduce the wettability (and thus prevent disintegration) of the starch or pigment-starch combinations. Again, this has not proven generally successful due to the introduction of undesirable side effects such as loss of brightness and large increases in viscosity.

(3) The addition of materials which combine chemically with the starch molecule either through cross-linking between adjacent starch molecules or by attachment to hydrophilic groups on the starch molecule. In the former case it is thought that there is formed a new cross-linked molecular structure, strong enough to resist the deleterious action of water, while in the latter case, it is thought that such blocking of the hydrophilic groups causes them to be unavailable for association with water.

As examples of the former type, a number of aldehyde resins such as urea-formaldehyde and melamine-formaldehyde resins have been widely used to insolubilize a variety of starch adhesives. The disadvantages of this type of insolubilization mechanism are: necessity of using fairly large amounts of the resin; insufficient wet-rub development; the need to include acidic catalysts or accelerators for curing of the resin-starch adduct; the requirement of considerable heat and/or time to effect the ---
[1] W. C. Black, Ch. XIV, Tappi Monograph Series, No. 17 (1957), Mack Printing Co., Easton, Pa.

cure; and, above all, the causing of possible undesirable large increases in viscosity of the coating color, making said coatings unsuitable for trouble-free running on existing coating machines. This is particularly an affliction in the field of high solids, on-the-machine coating colors where much of the starch for coating purposes is consumed. Nevertheless, in spite of all these disadvantages, this system of developing wet-rub is prevalent in the coated paper and paperboard industry today simply because it has been the best method available until now.

As examples of blocking of hydrophilic groups by attachment, certain multivalent-metal salts such as chromium and antimony have been found to be more or less effective in certain instances for insolubilizing starch films. From 5 to 10% of potassium pyro antimonate has been suggested for this purpose. Still, the method of insolubilization with metal salts has received practically no acceptance at all because of numerous practical difficulties among which are: bad color, high expense, excessive curing conditions necessary, incompatibility with other components of coating colors, excessive viscosity increases at high percent solids, and others. Therefore, whatever the mechanism by which varying degrees of insolubilization have been achieved, in no case of which I am aware has a really satisfactory method been developed to attain the desired degree of insolubilization of the starch film or a pigmented starch coating, within the practical operating limits of today's laminating and coating machines, until the discovery of my novel methods described hereinafter.

My invention involves the discovery that sodium stannate can precipitate starch solutions in the form of more or less rigid gels, depending of course upon the usual variants of concentration of reactants, etc. These rigid starch gels upon subsequent drying proved to be quite insoluble and resistant to the action of water in contrast to the state of extreme solubility of other portions of the same starch solution that had not been so treated. When an untreated starch solution was intimately mixed with a pigment slurry, such as a suspension in water of fine particle size domestic clay, in ratios commonly employed in the art of coating paper and the mixture then treated with sodium stannate, a thick viscous but apparently homogeneous mass was produced that upon application in a thin film to a paper base with a doctoring blade and upon subsequent drying in an oven yielded a dry, pigmented starch paper coating that possessed exceptionally good resistance to water quite superior to the inadequate wet-rub resulting from the employment of the aforementioned aldehyde resin class of materials. With certain exceptions to be noted later, this discovery was severely limited in its practical application to the art of coating paper and paperboard, because the concomitant high viscosities so produced in the coating color caused the aforesaid colors to be completely unsuitable for normal operations for on-the-machine type of paper coating equipment commonly employed in the coating of paper. Although my discovery is useful in so-called low-solids (below about 40% solids) coating operations of the size-press and off-the-machine types, it is still not commercially practical with high solids starch coating compositions of the types normally employed in the on-machine coating art.

The importance of proper rheological characteristics of a coating color for high-speed application on the machine cannot be overemphasized because coatings having properties lying outside a characteristic but narrow range of flow behavior will be inoperable in the coating process. The field of study of flow characteristics of coatings is very complex in itself and a number of instruments and methods have been devised for the measurement and definition of flow properties. Any coating can be classified [2] as to type of flow behavior, whether Newtonian, plastic, pseudo-plastic, thixotropic plastic, dilatant, and so on, and values can be obtained through the use of high shear viscometers for such specific properties as apparent viscosity, plastic viscosity, yield value, coefficient of thixotropy, and leveling index. Without going further into the intricacies of this complex field, the point to be made is that the inclusion of a potential insolubilizing agent, particularly of the metal ion form, which is likely to give fast reactions, cannot affect adversely any of the many basic rheological characteristics of the coating color, particularly at high solids, and still suitable for practical use on current high-speed paper coating machinery.

Sodium stannate can be used to insolubilize starch films or coatings by incorporating the salt directly into a low solids aqueous coating composition containing the starch. The composition can then be applied to the surface desired such as paper, and dried, preferably with heat, to form the insolubilized starch film or coating. Starch films and coatings can also be insolubilized, according to this invention, by forming an aqueous coating composition, and now a high solids composition can be used, containing starch as the primary adhesive and applying this composition, which does not contain the salt, to the desired base. The starch coating or film, while it is moist, can then be treated with the salt with a so-called "wash-coat" operation. The coating can of course be conventionally dried (below 10% moisture) and remoistened advantageously by the aqueous portion of the salt bath. This can be advantageously accomplished by running the starch coated base through a bath of the salt and then subsequently through a pair of rubber squeeze rolls to reject entrained excess insolubilizing solution. The moist coating containing the salt insolubilizing agent can then be dried in any conventional manner.

The sodium stannate cannot be directly incorporated into aqueous starch coating compositions having high solids content. The salt causes a gelling action to take place resulting in abnormally high viscosities which render these coating compositions unsuitable for application by conventional types of coating equipment currently in use in the paper and paperboard industry.

As previously mentioned, difficulties are even encountered when sodium stannate is incorporated directly into low solids starch coating compositions. The invention thus also includes the coating of starch coating compositions with or without pigment onto a suitable substrate such as paper and treating the coated paper with a solution of sodium stannate by a wash-coat operation.

It is difficult to set any specific limits on the solids content of the starch coating compositions with respect to the salt since this will depend, to a great extent, upon the particular coating compositions and coating conditions involved, and so forth. Whether or not the salt can be used directly in aqueous starch coating compositions of a particular solids content can, however, be readily determined by routine experimentation by those skilled in the art. It can generally be stated that the salt cannot be successfully employed directly into aqueous coating starch compositions containing in excess of about 40% by weight.

It will be apparent to those skilled in the art that by proper adjustment of the concentration of the ingredients, including the salt, to suit the viscosity-time-presure requirements of a particular coating, laminating or corrugating mechanical process, many different formulations may be prepared to which the salts can be adapted. Therefore, I do not wish to be limited to the particular descriptions cited in the examples.

Various other materials can be incorporated into the coating compositions of my invention as will be appreciated by those skilled in the art, including other adhesives or binders in addition to starch which are compatible therein such as butadiene-styrene latices.

Various pigments can also be used including clay, calcium carbonate, titanium dioxide, blanc fixe, satin white,

---

[2] Reference: Culp, Ch. XI, Tappi Monograph No. 17.

and so forth. The pigment concentration can be varied widely and can be that commonly used in the coating industry.

The proportions of the various materials which can be used can readily be determined by those skilled in the art by routine experimentation, depending upon the particular properties desired in the coating formulation and final product.

For example, the amount of salt used will be determined by the degree of insolubilization desired in the final product. A sufficient amount should, of course, be used to impart the insolubilization desired to the resulting coating. As the amount of salt is increased, the extent of insolubilization of the resulting film also generally increases.

The term "free of carboxyl groups" is used herein to mean that the starch does not contain sufficient carboxyl groups to result in any significant reaction between the salts and the carboxyl groups which will interfere with or significantly alter the complex reaction which occurs between the salt and the starch in the absence of carboxyl groups. Enzyme converted starches are particularly advantageous for insolubilization according to this invention and such enzyme converted starches generally contain on the average of about 0.02% by weight carboxy groups which value can be considered zero for all practical purposes.

In elucidating the full scope and practical utility of my invention, it will be helpful to present in detail practical operating examples as a guide for those who wish to follow the teaching of my novel discoveries.

*Example 1*

Step 1: A book-lined, four-ply cylinder board of about 200 lbs. per ream (25" x 38"/500) basis weight was coated on one side at about 15 lbs. dry weight per ream with a composition consisting essentially of 100 units of fine particle coating clay and 25 units of cooked starch adhesive, the coating composition containing about 60% of nonvolatile solids and 40% of water.

Step 2: After partial drying, but still being in a moist state, the so-coated board was led around a backing roll so that the freshly-coated but partially-set surface was immersed momentarily in an aqueous bath containing 5% of sodium stannate solids.

Step 3: After emergence from the insolubilizing bath the now gelled coated surface and board base was led through a pair of rubber squeeze rolls to remove excess entrained liquid from the bath.

Step 4: The so-treated moist coated board was dried in an oven until dry at which time it was determined that a high degree of insolubility had been produced in the coated surface of the coated cylinder board.

*Example 2*

The process of Example 1 was repeated but the starch coating on the paper was first dried to a moisture content of less than 10% (actually between 4 to 6%) before being treated with the sodium stannate bath. The same insolubility of the starch coating as in Example 1 was obtained.

I claim:
1. The process of forming an insolubilized starch coating on paper which comprises coating paper with an aqueous starch solution, at least partially drying the coating, treating the coating by immersing the coating in an aqueous bath consisting essentially of water and a sufficient amount of sodium stannate to render the starch coating insoluble when dried, and drying the treated coating.
2. The process of claim 1 in which the starch is an enzyme converted starch.
3. The process of claim 1 in which the starch solution contains an inorganic pigment.
4. The process of claim 3 in which the solids content of the starch coating is in the range of 30-65%.
5. The process of claim 4 in which the starch is an enzyme converted starch.

References Cited by the Examiner

UNITED STATES PATENTS

| | | | |
|---|---|---|---|
| 2,468,207 | 4/1949 | Kerr | 106—210 |
| 2,570,499 | 10/1951 | Signaigo | 106—214 |
| 2,788,293 | 4/1957 | Caldwell et al. | 106—213 |
| 3,081,199 | 3/1963 | Taylor | 106—213 |

WILLIAM D. MARTIN, *Primary Examiner.*

H. W. MYLIUS, *Assistant Examiner.*